United States Patent [19]

Hatton et al.

[11] Patent Number: 5,212,421
[45] Date of Patent: May 18, 1993

[54] VIBRATION TRANSDUCER ASSEMBLY

[75] Inventors: Bruce M. Hatton, Carol Stream; Jaklin Yoesep, Arlington Heights; Stephen M. Hutchings, Oswego, all of Ill.

[73] Assignee: Eaton Corporation, Cleveland, Ohio

[21] Appl. No.: 622,703

[22] Filed: Dec. 5, 1990

[51] Int. Cl.$^5$ .............................. H01L 41/08
[52] U.S. Cl. ..................... 310/329; 310/324; 73/35
[58] Field of Search ............... 310/329, 312, 324, 321; 73/35, 651, 654

[56] References Cited

U.S. PATENT DOCUMENTS

| | | | |
|---|---|---|---|
| 4,156,156 | 5/1979 | Sweaney | 310/312 |
| 4,190,782 | 2/1980 | Guess | 310/324 |
| 4,193,647 | 3/1980 | Guess et al. | 310/324 |
| 4,371,804 | 2/1983 | Peng et al. | 310/321 |
| 4,630,465 | 12/1986 | Hatton | 310/324 X |
| 4,638,205 | 1/1987 | Fujita et al. | 310/324 X |
| 4,660,410 | 4/1987 | Asano et al. | 310/329 X |
| 4,727,279 | 2/1988 | Peng | 310/329 |

FOREIGN PATENT DOCUMENTS 0079800 5/1982 Japan .................................. 310/324

Primary Examiner—Mark O. Budd
Attorney, Agent, or Firm—R. A. Johnston

[57] ABSTRACT

A vibration transducer for sensing engine knock. On embodiment for resonance upon vibration at frequencies in the range of 5-7 KHz has a centrally stanchion-supported overhanging metal disc with an annular stiffening portion formed with in transverse section with contracurvature and generally rectangular configuration for minimizing ringing. Piezoelectric material is bonded to the disc surface inwardly of the stiffening portion for providing an electrical signal during resonant disc flexure. A second embodiment for resonance upon vibration at frequencies in the range of 9-15 KHz has a centrally stanchion-supported overhanging metal disc with an annular stiffening portion for minimizing ringing formed in transverse section with contracurvature comprising a generally semicircular convolution. Piezoelectric material is bonded to the disc surface and bridges the stiffening portion and provides an electrical signal during resonant disc flexure.

8 Claims, 3 Drawing Sheets

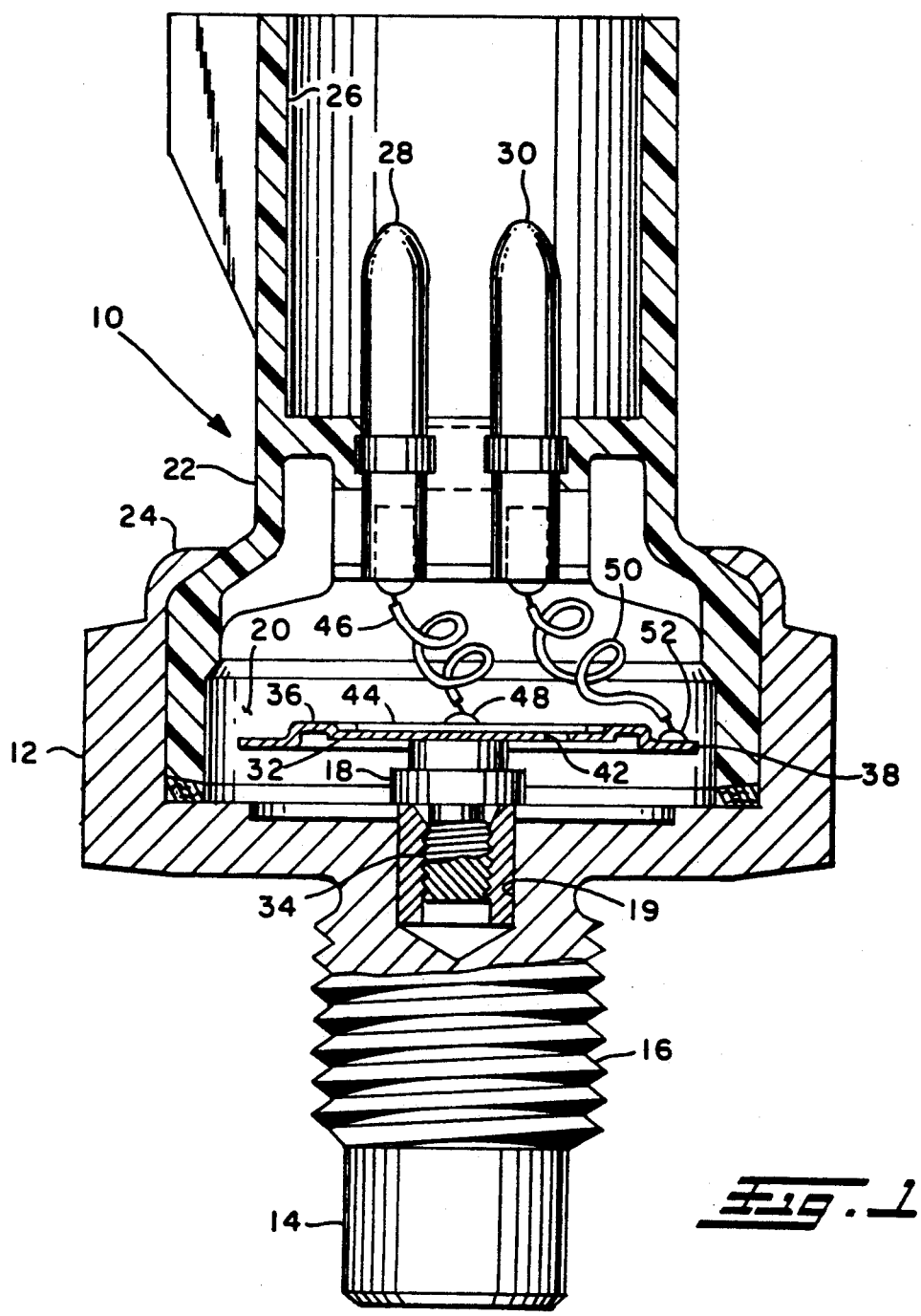
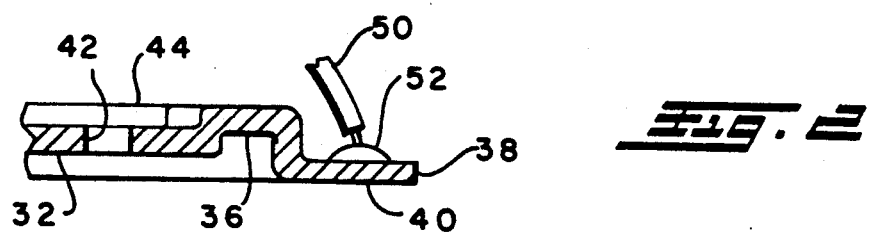

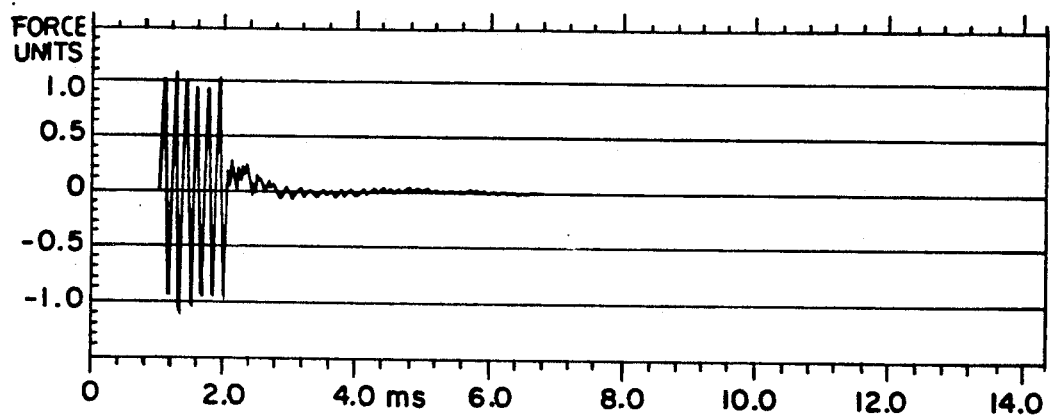
_Fig. 5_
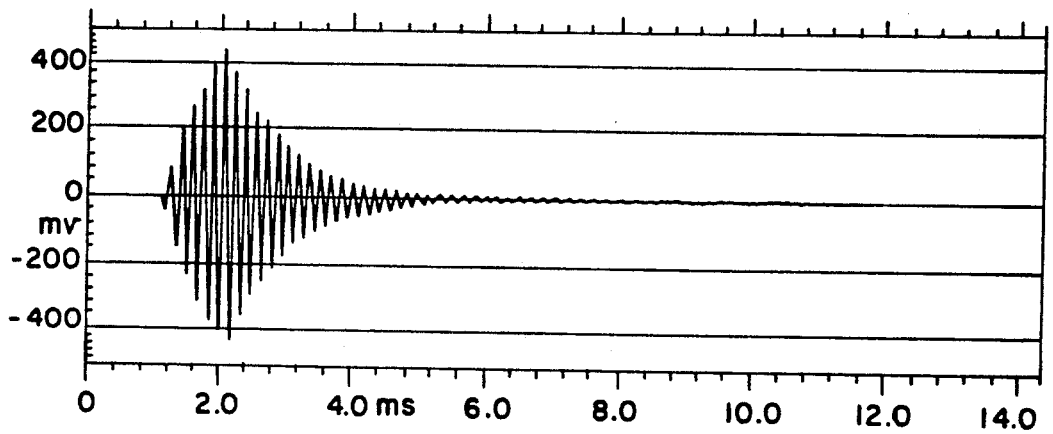
_Fig. 6_
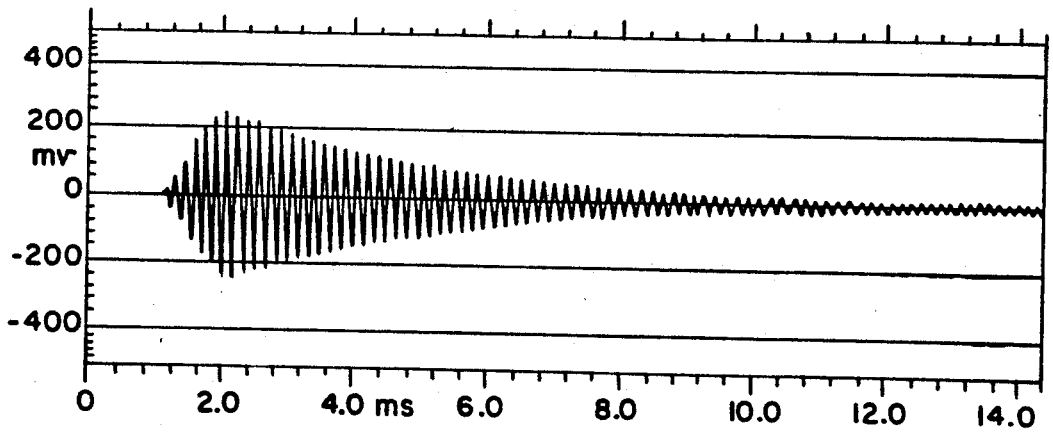
_Fig. 7_

VIBRATION TRANSDUCER ASSEMBLY

BACKGROUND OF THE INVENTION

The present invention relates to transducers for generating an electrical signal in response to a sensed vibration, and is particularly suitable for application as a sensor to detect the vibration that creates the relatively high frequency sound generated in an engine as a result of improper or premature combustion, often referred to as "knocking" or "pinging". Such knock sensors are used for providing an electrical signal to a microcomputer employed for controlling engine spark timing and electronically controlled fuel injection. Typically in such engine applications, when a signal is received by the microcomputer from the knock sensor, the ignition spark timing is appropriately retarded to prevent continuation of the knocking condition.

Heretofore, vibration transducers employed for sensing engine knocking or knock sensors have employed a centrally supported overhanging metal diaphragm having piezoelectric material bonded to the central portion of the diaphragm for providing an electrical signal in response to resonant flexure of the diaphragm upon vibration of a preselected frequency being imparted to the diaphragm mounting structure. Knock sensors of the aforesaid construction typically provide a high "Q" or a narrow band width displayed in graph of sensor output versus frequency, with the band width being a portion of the graph on both sides of the resonant frequency.

Typically, it has been though desirable to provide a relatively high "Q" for knock sensors in order to have a significant electrical signal output at the resonant frequency to facilitate detection, with a substantially lower signal at frequencies slightly adjacent the resonant frequencies. However, it has been found that a knock sensor having a relatively high "Q" or narrow band width exhibits the characteristic of continuing to provide an electrical signal output upon cessation of the vibration input for a significant duration of time thereafter. This slow output delay phenomenon of the sensor is sometimes referred to as "ringing". This phenomenon or disadvantage of high "Q" knock sensors tends to limit the sampling interval of the sensor. This limitation becomes critical when the engine is operated at a high enough RPM when the interval between firing in the cylinders is of an order of magnitude equal the time required for the sensors to dampen out. Problems have been encountered in certain frequency bands with known knock sensors of the aforesaid type wherein the high "Q" or signal gain properties of the sensor have extended the period of ringing sufficient to prevent the knock sensor from responding adequately at engine RPMs encountered at the upper limit of engine operating speed in excess of 5000 RPM. A four cylinder, four cycle engine running at 5000 RPM fires once each six milliseconds.

Heretofore, attempts have been made to improve the performance of such known transducers by providing an annular convolution or rounded ring-groove semicircular in transverse section in the metal disc.

Thus, it has been desired to provide a vibration transducer for engine knock detection applications which has a high signal output upon detection of acoustic vibration resulting from engine knock, and yet provides rapid enough damping to permit the knock sensor to be effective at high engine RPMs.

SUMMARY OF THE INVENTION

The present invention provides a piezoelectric vibration transducer which has a relatively low "Q" or broad band response at the preselected frequency for knock detection, with adequate electrical signal output and yet has rapid enough damping to provide knock detection at high engine RPMs.

The transducer of the present invention employs a central stanchion-mounted metal diaphragm having piezoelectric material bonded to the surface thereof for strain flexure signal generation upon the diaphragm experiencing resonant vibrations at the selected frequency input. The metal diaphragm of the present invention overhangs the stanchion and has an annular stiffening portion provided radially intermediate the stanchion and the outer periphery of the diaphragm. In one embodiment of the invention employed for knock sensing at a resonant frequency in the range 5-7 KHz, the annular stiffening portion has in transverse section contracurvature and a generally rectangular configuration, with the remaining portion of the disc radially outwardly thereof offset from the central portion of the disc. The piezoelectric material is bonded to the surface in the central region radially inwardly of the stiffening portion.

In a second embodiment, the stiffening portion of the metal disc comprises in transverse section a semicircular convolution with the piezoelectric material radially bridging the convolution.

The transducer construction of the present invention provides improved stiffness to the metal diaphragm without increasing the thickness or mass thereof, and provides improved attenuation and dampening of ringing.

BRIEF DESCRIPTION OF THE DRAWINGS

FIG. 1 is a cross-section taken along the axis of symmetry of the transducer of the present invention employed for resonating at a frequency in the range 5-7 KHz;

FIG. 2 is an enlarged view of a portion of FIG. 1;

FIG. 5 is a plot of force unit versus time for a vibratory input to the transducer of 6 KHz.

FIG. 6 is a plot of transducer output in millivolts versus time in milliseconds for the present invention vibrated by the input of FIG. 1; and, FIG. 7 is a plot similar to FIG. 6 for a prior art transducer.

DETAILED DESCRIPTION

Figure 3:
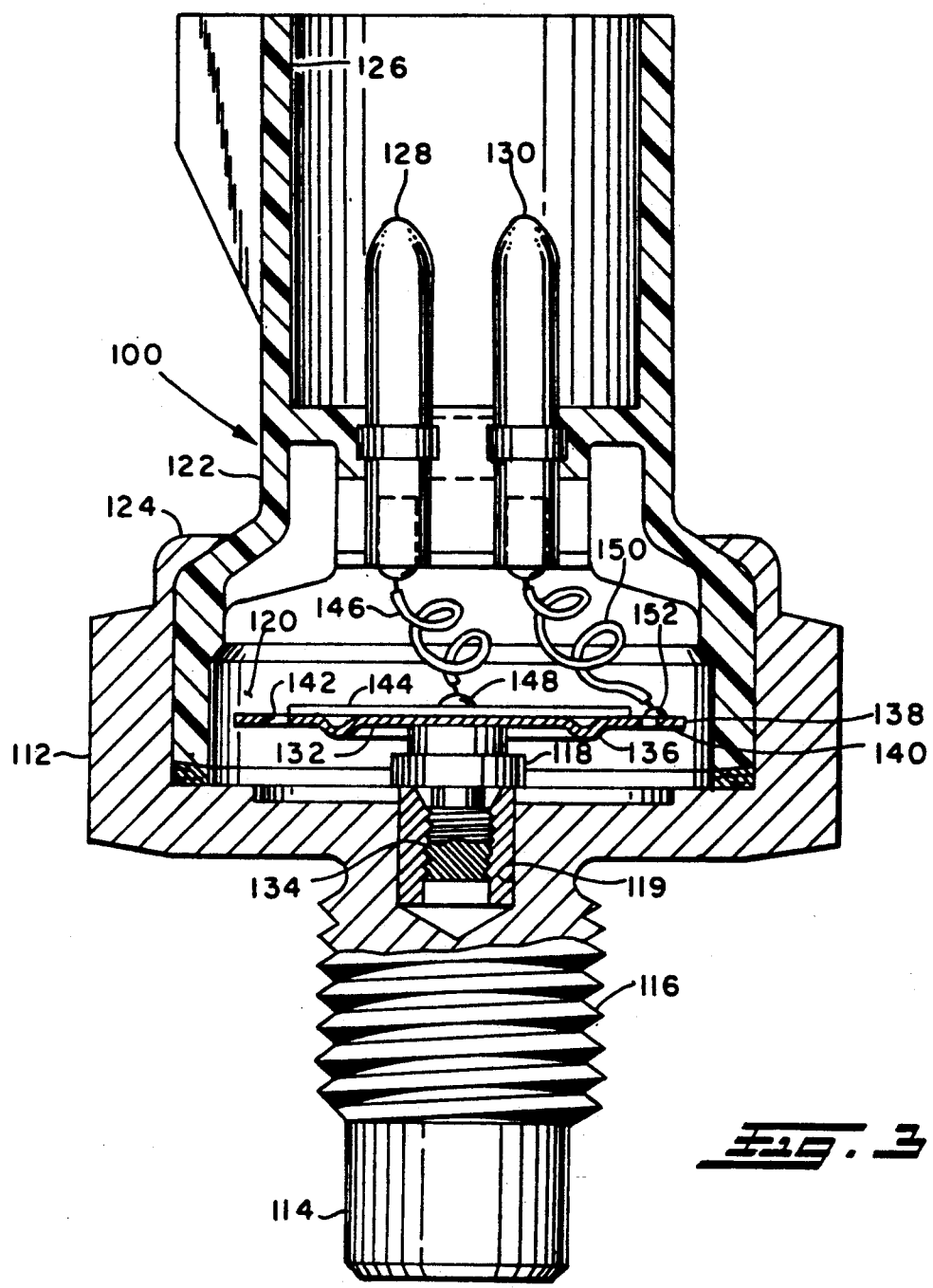
FIG. 3 is a view similar to FIG. 1 of another embodiment of the invention employed for resonance in the frequency range 9-15 KHz; and, FIG. 4 is an enlarged view of a portion of FIG. 3.
Figure 4:
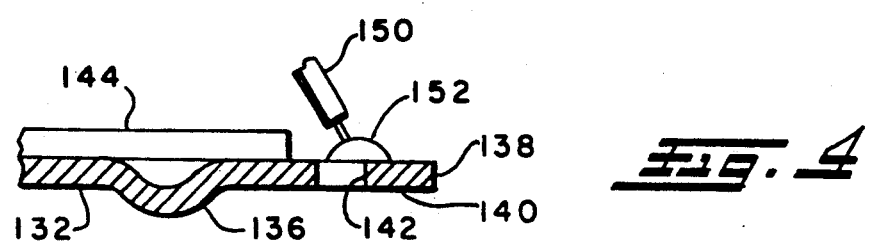

Referring to FIG. 1, a first embodiment of the transducer assembly for detecting resonance in the frequency range 5-7 KHz is indicated generally at 10 as having a mounting structure or body 12 with a reduced diameter portion 14 extending downwardly therefrom, and provided with threads 16 for rigid attachment to a vibrating structure, as for example the cylinder block of an internal combustion engine. Body 12 has a plug or stanchion 18 received in a central counter-bore 19 provided therein in preferably pressed-fitting arrangement or adhesively; and, the stanchion extends into a sensing cavity 20 formed in the body 12. Cavity 20 is closed by a cover 22 secured therein by any suitable expedient, as for example the formed metal flange 24. The upper portion of cover 22 provides an electrical connector cavity 26, which has mounted therein a pair of spaced electrical connector pins 28, 30 adapted for engagement into a corresponding harness connector. The lower end of pins 28, 30 extend into the chamber 20. The cover 22 is formed of electrical insulating material to isolate the pins 28,30 from the body.

Stanchion 18 has a rigid metal disc 32 attached to the upper end of the stanchion, and secured thereon by any suitable attachment means as, for example welding.

Disk 32 has an annular stiffening portion 36 formed integrally therein radially intermediate the stanchion and the outer periphery 38 of the diaphragm.

Referring to FIG. 2, the annular stiffening portion 36 is shown enlarged, and as having in transverse section, contracurvature and a generally rectangular configuration. In the presently preferred practice, the portion of disc 32 radially outwardly of the stiffening portion 36 is offset in the vertical or axial direction from the central portion of the disc 32. It has been found satisfactory to offset the outer portion 40 of the disc axially by an amount of about one thickness of the disc 32.

In the presently preferred practice, the metal disc 32 has allowance for resonance at a frequency in the range 5-7 KHz, a diameter-to-thickness of about 61, and when formed of an iron-nickel alloy No. 42 per ASTM F30, and having a thickness on the order of 0.012 inches (0.30 mm). In the preferred practice, the stiffening portion 32 is disposed such that its inner diameter is located at about eighty six percent (66%) of the radius of the disc, with the radial width of the stiffening portion 36 about five percent (7%) of the diameter of the disc.

As an aid to tuning the disc, a plurality of circumferentially spaced holes denoted by reference numeral 42 in FIG. 2 are provided in the central portion of the diaphragm 32 in circumferentially spaced arrangement. In the presently preferred practice for the aforementioned disc, twelve circumferentially equally spaced holes having a diameter of 0.0420 inches (1.06 mm) are provided in the disc at a common radial location of about sixty six percent (58%) of the radius of the disc.

Although the particular size and location of the apertures 42 has hereinabove been described with respect to the particularly selected resonant frequency range, it will be understood that the size and number of the apertures 42 may be varied as required to tune the disc for resonance at frequencies outside the 5-7 KHz range.

A ceramic disc of piezoelectric material 44 is adhesively bonded to the upper surface of the disc 32 in the central region thereof. The piezoelectric material is connected to terminal pin 28 by an electrical lead 46 which has one end thereof attached to the piezoelectric material by a suitable solder connection 48. In the presently preferred embodiment of the invention, the piezoelectric material is a lead zirconate titanate material available from Motorola Ceramic Products of Albuquerque, New Mexico, bearing manufacturer's designation D3203.

The opposite electrical terminal 30 is connected by lead 50 to the outer portion of diaphragm 32 by a suitable soldered connection denoted by reference numeral 52.

Referring to FIG. 3, a second embodiment of the invention transducer assembly is indicated generally at 100, and has a body 112 having a reduced diameter attachment portion 114 which is provided with external threads 116 for threaded attachment to the vibrating structure such as an engine block.

A mounting stanchion 118 is received in a bore 119 provided in the body, and secured thereto in any convenient manner as, for example, threaded assembly into a spacer at 34 which is press-fit and adhesively retained in core 119. The stanchion 118 extends into an enlarged cavity 120 provided in the body which is closed by a cover 122, which is retained in the body by a deformed flange 124. The cover 122 extends upwardly and defines an electrical connector cavity 126 which has provided therein spaced terminal pins 128, 130 which extend downwardly into the cavity 120. The cover 122 is formed of electrically insulating material to isolate pins 128, 130 from the body.

A rigid metal vibratable sensing disc 132 is attached to the top of the stanchion 118 and is retained thereon by any suitable expedient as, for example, welding. The sensing disc 132 has an annular stiffening portion 136 formed integrally in the portion of the disc 132 which overhangs the stanchion 118, intermediate the stanchion in the outer periphery of the disc.

The outer peripheral region 140 of disc 132 is preferably aligned with the central portion 132 thereof. In the presently preferred practice, the annular stiffening portion has a generally semicircular transverse cross-section, and the inner radius of the convolution in transverse section is about twice the thickness of the material of the disc. In the presently preferred practice, the metal disc 132 has a diameter-to-thickness ratio of about 41, with the center radius of the convolution 136 comprising about thirty six (36%) of the full radius of the disc 132. In the presently preferred practice, the disc 132 has a thickness of 0.018 (0.46 mm) and has a plurality of apertures 142 provided in the outer peripheral portion 140 thereof in circumferentially spaced arrangement. For resonant frequencies in the range 9-15 KHz, in the present practice, six apertures, each having a diameter of 0.041 (1.04 mm) are equally spaced about the circumference of the disc 132, and located at a common radius of 0.32 inches (7.62 mm).

A ceramic disc 144 formed of piezoelectric material is bonded to the upper surface of the disc 132; and, the piezoelectric material extends outwardly bridging radially over the convolution 136 and on to the outer peripheral region 140 of the disc 132. The piezoelectric material 144 thus provides additional stiffening to the disc 132 without the necessity of increasing the thickness or mass of the disc. In the presently preferred practice, the piezoelectric material 144 is a lead zirconate titanate material obtainable from Motorola Ceramic Products, Albuquerque, New Mexico, bearing manufacturer's designation D3203.

The disc 144 has an electrical lead 146 from terminal pin 128 connected thereto by suitable solder joint as indicated by reference numeral 148 in FIG. 3. The outer peripheral portion 140 of the disc 132 has one end of an electrical lead 150 from terminal pin 130 soldered thereto as indicated by reference numeral 152 in the drawings.

The present invention thus provides an improved vibration transducer suitable for knock sensing in an internal combustion engine, and has an annular stiffening region formed in a metal vibratable sensing disc which has piezoelectric ceramic material bonded to the upper surface thereof for generating an electrical signal in response to flexural straining by vibration of the metal disc. In one embodiment the annular stiffening portion comprises a transverse section an integral portion of contraflucture having a generally rectangular cross-section. In a second embodiment, the annular stiffening portion in transverse section comprises a generally semicircular convolution with the piezoelectric material bridging the convolution.

Referring to FIGS. 5, 6, and 7, graphical plots are shown of the response of the invention transducer in FIG. 6 and the prior art devices in FIG. 7 for a vibratory input as shown in FIG. 5. The input of FIG. 5 provides, at 1.0 force units, about 20 meters/second$^2$ of acceleration to the transducer body at a frequency of 6 KHz for about 1 millisecond's duration.

FIG. 6 illustrates the electrical output of the transducer of FIG. 1 in response to the vibration of FIG. 5. From the graph in FIG. 6, it will be seen that the transducer resonates, gaining amplitude while the input is present, and emits a peak out about 430 millivolts, and stops "ringing" within 2 milliseconds after cut-off of the FIG. 5 vibration.

Referring to FIG. 7, the electrical output of a typical prior art transducer assembly, such as shown and described in U.S. Pat. No. 4,630,465, having a piezoelectric element and an annular convolution, generally semicircular in transverse section, formed in the metal disc or diaphragm is illustrated. It will be seen from the plot in FIG. 7 that the prior art device, without a new piezoelectric element and the rectangular annular stiffening groove of the present invention fails to stop ringing within 14 milliseconds.

In engine knock sensor applications, where the engine fires at six millisecond intervals, it is readily seen that the performance of the transducer of FIG. 7 renders the device unusable; whereas, the invention transducer having the output of FIG. 6 is satisfactory. Although not illustrated herein, the transducer of FIG. 3 has been found, when vibrated in the frequency range 9–15 KHz, to give an electrical output substantially the same as the device of FIG. 1, and as shown in FIG. 6.

The present invention thus provides a vibration transducer suitable for application as an engine knock sensor and employs a centrally stanchion-mounted vibratable metal sensing disc employing piezoelectric material bonded thereto for vibration-flexure sensing. The metal sensing disc has an annular stiffening convolution formed therein. One embodiment for 5–7 KHz resonant sensing employs a convolution contracurved in transverse section with a generally rectangular shape. Another embodiment for 9–15 KHz resonant sensing employs a convolution having in transverse section a semicircular shape with the piezoelectric material radially bridging the convolution. The present invention provides resonant disc vibration sensing in the described frequency range, yet provides improved dampening of "ringing" after cessation of vibratory input.

Although the invention has been herein above described with respect to the illustrated embodiment modifications and variations will be apparent to those of ordinary skill in the art; and, the invention is intended as limited only by the following claims:

We claim:

1. A vibration transducer assembly for sensing vibrations in a selected frequency range comprising:
   (a) body means adapted to receive vibratory movement from external structure and defining a stanchion thereon;
   (b) a rigid resonatable disc generally thin with respect to its diameter, said disc centrally supported on said stanchion in overhanging arrangement, said disc having an annular stiffening portion formed integrally therein intermediate said stanchion and the periphery of said disc, said stiffening portion having in transverse section a generally rectangular configuration with the portion radially outwardly of said stiffening portion offset from the central portion;
   (c) a piezoelectric member bonded to the surface of said resonatable disc and disposed centrally within said stiffened portion; and,
   (d) electrical lead means connected to said piezo member and said disc, wherein upon vibration of said body means in said selected range, said disc resonates and said piezoelectric member is flexurally strained and generates an electrical signal along said lead means.

2. The transducer assembly defined in claim 1, wherein said disc has a plurality of circumferentially spaced apertures formed therethrough at a common radius in the region intermediate said stanchion and said stiffening region. The transducer assembly defined in claim 1, wherein said disc has a diameter-to-thickness ratio of about 65:1.

3. The transducer assembly defined in claim 1, wherein the portion of said disc surrounding said stiffening portion is offset from the central portion.

4. A vibration transducer assembly for sensing vibration comprising:
   (a) body means having a stanchion provided thereon;
   (b) a rigid disc generally thin with respect to its diameter centrally supported on said stanchion in overhanging arrangement, said disc having an annular stiffening portion formed integrally therein intermediate said stanchion and the periphery thereof wherein said disc has the overhanging portion thereof radially outwardly of said annular stiffening portion axially offset from the portion thereof radially inwardly of said stiffening portion;
   (c) signal generating means attached to the surface of said disc in the central region thereof and operative to provide an electrical signal indicative of disc flexure upon vibrations being imparted to said body means, wherein said disc exhibits resonance upon said body means being vibrated and rapid damping upon cessation of said vibration.

5. The transducer defined in claim 4, wherein said offset is by an amount generally equal to the thickness of said disc.

6. A vibration transducer assembly comprising:
   (a) body means having a stanchion thereon;
   (b) a rigid disc, generally thin with respect to its diameter centrally supported on said stanchion in overhanging arrangement, said disc having an annular stiffening portion formed therein and the portion thereof radially outwardly of said stiffening portion offset from the central portion; and,
   (c) a layer of piezoelectric material bonded to the surface of said disc in the central region thereof bounded by said annular stiffening position for providing an electrical signal responsive to flexure of said disc upon experiencing vibrational input through said body means.

7. The transducer defined in claim 6, wherein said offset is by an amount generally equal to the thickness of said disc.

8. The transducer defined in claim 6, wherein said disc has a diameter-to-thickness ratio (d/t) of about 61.4.

* * * * *